No. 644,007. Patented Feb. 20, 1900.
A. G. FAYE.
PLANT PROTECTOR.
(Application filed May 5, 1899.)
(No Model.)
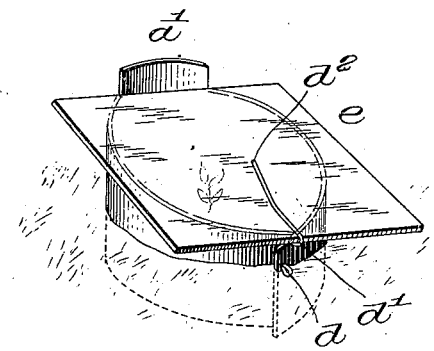
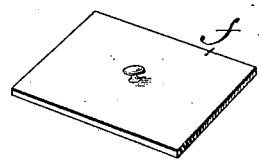
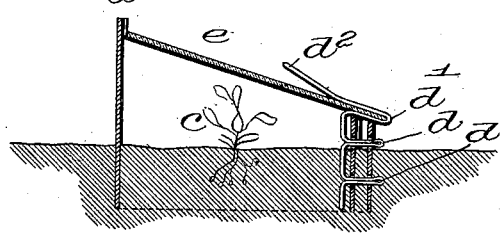
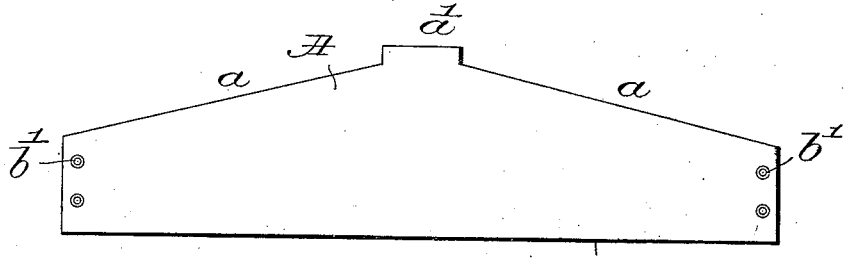
Witnesses:
Fred S. Grumhaf.
Adolf C. Kaiser.
Inventor
Alonzo G. Faye,
By Crosby Gregory
Attys.
THE NORRIS PETERS CO., PHOTO-LITHO., WASHINGTON, D. C.

UNITED STATES PATENT OFFICE.

ALONZO G. FAYE, OF MEDFIELD, MASSACHUSETTS.

PLANT-PROTECTOR.

SPECIFICATION forming part of Letters Patent No. 644,007, dated February 20, 1900.

Application filed May 5, 1899. Serial No. 715,650. (No model.)

*To all whom it may concern:*

Be it known that I, ALONZO G. FAYE, of Medfield, county of Norfolk, State of Massachusetts, have invented an Improvement in Plant-Protectors, of which the following description, in connection with the accompanying drawings, is a specification, like letters on the drawings representing like parts.

This invention has for its object the production of a novel, cheap, and efficient protector for growing and other plants to protect the same from cut-worms or other boring insects and also from early and late frosts and continued rains.

My protector is composed, essentially, of a flexible material adapted to be bent into the form desired for the protector, so that it may encircle the growing plant, said material being preferably a form of paper or leather-board and preferably for the best results treated so that it will be capable of withstanding moisture, dampness, or rain. This invention is not, however, limited to the use of paper or leather-board; but instead I may use any other low-cost flexible material.

The flexible material of which my protector is composed will preferably be so cut as to present a blank one edge of which is sloped oppositely from at or near the center of the length of the blank. This blank may have at its top between its sloped portions a stop, and the narrower ends of the blanks are adapted to be caught and held together by a suitable fastening device which in one approved form may present prongs to enter holes in the blank.

The blanks from which the protectors are made may be laid flat in a pile when not in use and for purposes of shipping, so that they may be kept in a comparatively small and compact space. When they are to be used, they may be easily bent into circular form and have their free ends suitably fastened together. The lower end of the connected blank may be pushed into the ground about a plant or thing to be protected or covered, and a pane of glass or other material may be laid on the upper end of the protector, as may be desired.

Figure 1, in perspective, shows one of my protectors as encircling a plant, the lower end of the protector being embedded in the ground, said protector supporting a glass. Fig. 2 is a section across the protector shown in Fig. 1. Fig. 3 shows a blank for a protector laid out flat. Fig. 4 shows one form of fastening which may be used to fasten together the ends of the protector. Fig. 5 represents a cover which may be applied to the protector to keep out cold or frost.

To make my improved protector, I take suitable paper, leather-board, or other flexible material, as A, and preferable cut it into the form of a blank, as represented in Fig. 3, said blank having sloping upper edges $a$ $a$, with preferably a shoulder $a'$ between.

The lower end of the protector-blank may be straight, as represented at $b$, and its ends may be provided with suitable holes to receive eyelets $b'$.

Referring to Fig. 2, let C represent the ground and $c$ a plant growing therein which it is desired to protect. To do this, I bend the blank, Fig. 3, into circular shape and overlap its ends and secure the same together. I may do this by means of a suitable fastening, as D, (shown at Fig. 4,) it being composed, as represented, of wire bent to present two prongs $d$ and an open loop $d'$, with a projecting end $d^2$. These loops may be long enough to extend for some distance through the eyelet-holes at both ends of the blank.

In the drawing Fig. 2, for the sake of clearness, the overlapping ends of the blank are separated some distance one from the other; but in practice they may lie in contact.

The fastener shown is inserted from the inner side of the protector formed by overlapping the ends of the blank, so that the loop part $d'$ stands open toward the projection $a'$.

The lower end of the protector will be pressed into the ground around the hills or drills containing the seed or around a plant to be protected to the depth of about three inches, and by sloping the top of the blank of which the protector is composed it is possible to present the glass $e$, which is laid upon the sloping side of the protector, so as to give the largest possible light-admitting surface from sunrise to sunset and so that the sun's rays are directed in the most approved manner and angle upon the ground inclosed by the protector.

With this protector inserted in the ground, as stated, and covered at its top with the glass $e$ it is impossible for cut-worms or other boring insects to gain access to the plants, and in case of cold weather or threatened frost the glass covers $e$ may be readily taken off and other covers, as $f$, (see Fig. 5,) composed of leather-board, wood, or other cheap material, may be laid onto the top of the protector instead of the glass. One edge of the glass enters the loop $d'$ and the other edge abuts generally against the projection $a'$; but if it should be desired to force the plants forward less in warm weather the upper edge of the glass may be laid on the top of the rest $a'$; but this will not be done when there is any danger of insects getting into the protector.

This invention is not limited to the particular shape shown for the fastening, and instead I may employ any other usual or suitable fastening; nor is the invention limited to the use in all instances of the projection $a'$ at the upper edge of the protector, although its use is in most instances desirable.

Having described my invention, what I claim as new, and desire to secure by Letters Patent, is—

1. A protector for plants, the same being composed of a blank or single piece of material having reverse inclines on its upper edge a projecting portion between them and a cover for said protector combined with a securing device to unite the ends of the blank, substantially as described.

2. A protector for plants, composed of a blank of flexible material having reverse inclines on its upper edge, a cover adapted to rest upon the inclines, and a securing device for the ends of the blank, provided with a projecting portion to engage the cover and prevent slipping thereof upon the inclines.

3. A protector for plants composed of thin flexible material adapted to have its lower edge driven in the ground and provided with a sloping upper edge, a cover to rest loosely upon and be supported by said sloping upper edge, and means projecting upward from the protector to prevent slipping of the loosely-supported cover upon the said sloping edge, substantially as described.

4. A protector for plants, the same being composed of a blank having reverse inclines on its upper edge and a projecting portion between them and being provided with eyelet-holes at its ends, combined with a fastening for the ends of the blank having a projecting portion to receive one edge of a glass to constitute a cover for the said protector.

In testimony whereof I have signed my name to this specification in the presence of two subscribing witnesses.

ALONZO G. FAYE.

Witnesses:
  GEO. W. GREGORY,
  MABEL PARTELOW.